United States Patent [19]
Nelson

[11] 4,407,669
[45] Oct. 4, 1983

[54] WASTE HEAT RECOVERY FROM REGENERATIVE FURNACES

[75] Inventor: Frederick J. Nelson, Swanton, Ohio
[73] Assignee: Owens-Illinois, Inc., Toledo, Ohio
[21] Appl. No.: 368,597
[22] Filed: Apr. 15, 1982
[51] Int. Cl.³ .............................................. C03B 5/16
[52] U.S. Cl. ........................................ 65/134; 65/17; 431/167
[58] Field of Search ...................... 65/27, 28, 134, 17; 431/167

[56] References Cited
U.S. PATENT DOCUMENTS 468,834  2/1892  Siemens ................................ 431/167
4,225,332  9/1980  Tsay ...................................... 65/134

*Primary Examiner*—Arthur D. Kellogg
*Attorney, Agent, or Firm*—Gerald T. Welch; Myron E. Click; David H. Wilson

[57] ABSTRACT

This invention relates to a method of operating a regenerative furnace to capture a greater portion of its waste heat. A substantially greater amount of air than that required for combustion is passed through the air intake side of the regenerative furnace. The non-combustion clean hot air is taken from the furnace and conducted to an auxiliary heat-utilizing apparatus mounted exteriorly of the furnace.

13 Claims, 10 Drawing Figures

ENERGY FLOW DIAGRAM

NO AIR EXTRACTION

ENERGY FLOW DIAGRAM

NO AIR EXTRACTION

ENERGY FLOW DIAGRAM

205000 SCFH OF AIR EXTRACTED TEN FEET
FROM TOP OF REGENERATOR CHECKERS

ENERGY FLOW DIAGRAM

109000 SCFH OF AIR EXTRACTED FROM
REGENERATOR UPPER STRUCTURE

WASTE HEAT RECOVERY FROM REGENERATIVE FURNACES

BACKGROUND OF THE DISCLOSURE

The present invention relates to new and useful improvements in regenerators for industrial furnaces and especially glass melting furnaces. It is among the objects hereof to provide a method of operating a regenerator of the conventional checker tile and brick construction having a substantial array of air preheat surfaces to obtain maximum increase in the sensible heat of the clean air stream passed through the regenerator structure.

A supplemental volume of preheated air is passed through the preheat surfaces in addition to the combustion air required for the furnace fuel combustion under operating conditions and divided therefrom for passage to an auxiliary heat-utilizing apparatus mounted exteriorly of the furnace. The air is preheated as a unitary stream of substantial volume during its passage through the hot heat-exchanging surfaces of the regenerator and prior to diversion of at least one secondary portion to the auxiliary heat-utilizing apparatus. The heat recovery structure of the regenerator requires no modification except for providing an outlet orifice for the stated secondary portion of preheated air, preferably in a regiobn adjacent to the furnace combustion zone. Thus, the auxiliary heat-utilizing apparatus can be supplied with clean preheated air having a temperature ranging from about 1000° to 2000° F., for example, which can be employed for power generation or other purposes without unduly penalizing furnace operating conditions.

Another object of the present invention is to provide a method of deriving a significant amount of waste heat from the clean air side of the hot checkerwork region of a regenerator furnace in regulatable quantities without appreciably changing furnace operating conditions or structure. A supplemental hot clean air stream is obtained from the heated surfaces of the regenerator which can be diverted to achieve maximum utilization of the heat storage.

A still further object of the invention is to provide a method of recovering furnace waste gas energy in a clean form for use in a wide variety of auxiliary heat-requiring devices.

FIELD OF THE INVENTION

Furnace waste heat recovery devices and systems normally involve insertion of heat exchangers into the waste gas exhaust stream. Deposition of particulate matter from the waste gas stream on heat-exchanger components leads to fouling and corrosion, thus requiring costly construction and soot blowing, flushing or other cleaning systems to maintain a high level of heat-exchanger performance. The subject process yeilds auxiliary waste heat recovery without passing waste gas through an auxiliary heat exchanger, thus avoiding complications associated with particulates and acids condensed from dirty furnace waste gas.

This invention concerns the use of furnace combustion air preheat devices i.e. regenerators, to convert waste heat from the form of hot, dirty exhaust gases to a clean hot air stream for use in auxiliary heat-recovery devices, without inserting any additional heat exchangers into the waste gas stream. Thus, a basic advantage of the present invention involves the extraction of sizable quantities of energy in the form of an auxiliary preheated air stream from the combustion air portion of the furnace system.

SUMMARY OF THE INVENTION

For a regenerative furnace, the combustion chamber waste gas contains more energy than can be utilized for preheating combustion air. Most of the excess energy is normally vented to the atmosphere in the form of hot waste gas. The subject method consists of supplying additional or auxiliary air, in excess of combustion air requirements, to the alternating air intake side of the regenerator inlet. Together with the combustion air, the auxiliary air stream is heated by the regenerator refractory surfaces. Rather than permitting the auxiliary air stream to pass through the combustion chamber as excess air, the stream is extracted from the air regenerator through an opening in the regenerator wall leading to a valved duct which carries the hot air to the desired auxiliary heat-exchanger. Such a valved duct is supplied for each of the two regenerators, with the valves opening and closing the ducts in unison with the regenerator reversals such that the extracted auxiliary hot gas is always obtained from the air intake side of the system. The precise location of the openings in the regenerator walls depends on the desired temperature of the extracted air. By providing both a high temperature and a low temperature opening in each regenerator wall the extracted air flow rates can be modulated with variable valves to provide a variety of controlled extracted air temperatures. The total extracted air flow rate can also be determined by controlling the static pressure in the extraction ductwork.

In many forms of conventional systems, additional heat recovery from the waste gas manifests itself in the form of colder waste gas exhausting from the regenerator system. The auxiliary air stream removes more heat from that which is stored in the regenerator refractories, thus cooling the storage media to colder temperatures than would occur with combustion air only. During the subsequent reversal of the regenerator system, the colder media are capable of absorbing more energy from the waste gas, thus exhausting the waste gas from the system at a colder temperature. The net effect is the transfer of heat from the dirt-laden waste gas stream to an auxiliary clean air stream extracted from the alternating air side of the system. A net energy savings is realized if the extracted hot air stream is delivered to a reasonably efficient heat-exchanger or other heat-utilizing process or apparatus other than the combustion chamber generating the original waste gas.

For example, if the extracted air is used to preheat the raw materials being heated in the furnace, then the energy savings are reflected directly in reduced furnace fuel consumption. Otherwise, the extracted air stream can be used to generate another useful product, such as stream or electricity, for example. The presence of the auxiliary air stream tends to yield a slight reduction in the combustion air preheat temperature. A net energy savings can be realized if the use of the extracted air stream offsets the loss of combustion air preheat energy. Many heat exchange devices readily fulfill this requirement. The subject air extraction process eliminates the problems associated with dirty furnace waste gas which tend to foul such devices and prevent their long-term continuous efficient operation.

DESCRIPTION OF THE PREFERRED EMBODIMENT

The present invention involves an improved process for waste heat recovery from regenerative furnaces and especially glass melting regenerative furnaces. A computer model capable of performing analytical glass furnace energy balances was used to demonstrate several examples of the hot air extraction process. The data employed were based on an improved type of glass furnace design and operating conditions, the furnace being an endport regenerative furnace nominally melting about 180 tons per day of soda-lime container glass. The computer simulation of the actual furnace data, i.e. the "base case", involved no intentional hot air extraction.

Four energy balance simulations were performed, representing hot air extraction at two different volumetric flow rates at each of two different elevations along the air regenerator walls. The specific walls for such air extraction are preferable exteriorly facing on the air intake side of the regenerator. The extracted volumetric flow rates for the preheated air were specified as imput data for the computer model, and were estimated to yield extracted energy flow rates of approximately two million BTU/HR and four million BTU/HR at each location.

The locations for extraction of the preheated secondary air were (a) about ten feet from the top of the air regenerator checkerwork, i.e. where the total checkerwork height equals 23¼ feet, and (b) the regenerator upper structure above the checkers. The following table summarizes the specified air extraction flow rates:

TABLE I

| Approx. Extracted Energy Flow Rate (million BTU/HR) | Extraction Volumetric Flow Rate (SCFH)* | |
|---|---|---|
| | 10' from Top of Air Checkers | Air Regenerator Upper Structure |
| 2 | 95,000 | 51,000 |
| 4 | 205,000 | 109,000 |

*SCFH = standard cubic feet per hour;

Standard Conditions: Atmospheric Pressure, 60° F.

Figure 7:
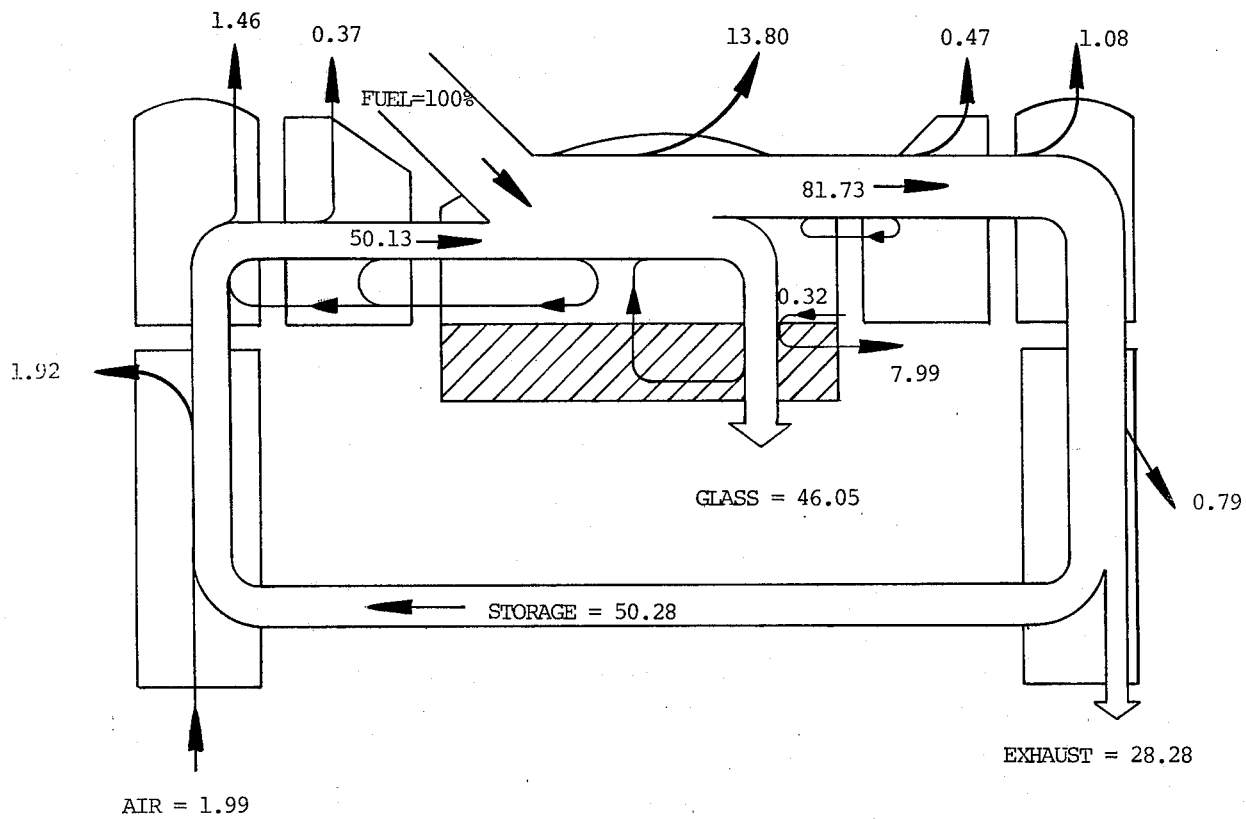
FIG. 7 is a schematic energy flow diagram of the same furnace shown in FIGS. 1 to 6 with no air extraction.

For each location, the base case, as shown in FIG. 7, provided an additional "extraction" flow rate due to the unintentional leakage of air out of the system, in one case through cracks in the regenerator sidewalls, and in the other through open peepholes in the regenerator upper structure. The flows were near zero in each case.

It is important to note that none of the simulations attempted to account for the manner in which the extracted hot air would be utilized in a heat-utilizing apparatus. The examples only demonstrate the effects on the glass furnace energy balance to show how waste heat can be recovered as a clean continuous stream of hot air.

The process basically involves introducing a substantial volume of primary and secondary air, the combined volume of which is greater than that required for combustion, into the air intake side of the regenerative furnace. The entire combined volume of primary and secondary air is passed as a unitary stream through at least a portion of the hot heat-exchange surfaces of the regenerative furnace to substantially increase its sensible heat. The primary portion of the preheated air is conducted to the combustion zone of the furnace to achieve optimum combustion of the furnace combustible fuel. Usually this requires the stoichiometric amount of air for furnace fuel combustion plus a minor amount in excess thereof to ensure complete combustion. The air may be conducted through essentially all of the hot checkerwork region of the regenerative furnace or only a portion thereof prior to dividing the primary and secondary streams. The secondary portion of the preheated air is conducted exteriorly of the furnace to an auxiliary heat-utilizing apparatus, such portion having a temperature ranging from about 1000° to 2000° F., for example. The secondary portion may be directed as a clean hot air stream to a heat-exchanger for power generation or other use as desired or required.

It may be desirable to pass the secondary or extracted portion of the preheated air through essentially all or only a limited area of the available heat-exchange surfaces. Further, the volume of the secondary extracted portion may be less than, equal to, or greater than the primary portion of preheated air conducted to the combustion zone. As stated, the primary portion preferably comprises the stoichiometric amount of air for furnace fuel combustion plus an additional minor amount in excess thereof to insure complete combustion of the fuel. In certain instances both primary and secondary portions are passed through all of the hot checkerwork region of the regenerator, the streams being divided and diverted from the upper structure thereof.

A valved duct carries the hot air to the desired auxiliary heat-exchanger. Such a valved duct is supplied for each of the two regenerators located on opposite sides of the furnace, with the valves opening and closing the ducts in unison with the regenerator reversals. Thus, the extracted auxiliary hot air is always obtained from the air intake side of the furnace. The precise location of the extraction air outlets in the regenerator sidewalls depends on the desired temperature of the extracted air. Where both high and low temperature openings are formed in the regenerator walls, the flow rates of the extracted air can be controlled with variable valves to provide a wide variety of controlled extracted air temperatures. The total extracted air flow rates can also be determined by controlling the static pressure in the extraction ductwork. A forced draft does not necessarily need to be used with the subject process although it may be desirable under certain conditions.

As may be readily appreciated in the conventional operation of an air regenerator, the air intake side of the regenerator is alternated from one side to the other on an equi-timed basis, normally about a 20 to 30 minute interval. The secondary extracted air may be preheated to a temperature ranging from about 1000° to 2000° F. or lower depending upon the end use requirement. The temperature of the secondary air portion may be controlled such as by dilution with ambient air for its delivery to the point of use. It is preferred that the auxiliary heat-exchange apparatus be mounted exteriorly adjacent to the regenerator furnace. The secondary air portion will generally have a temperature in excess of normal waste gas temperature and exist in the form of a clean hot air stream. Thus, the air intake side can be used to add great amounts of sensible heat to a supplemental air stream.

Figure 1:
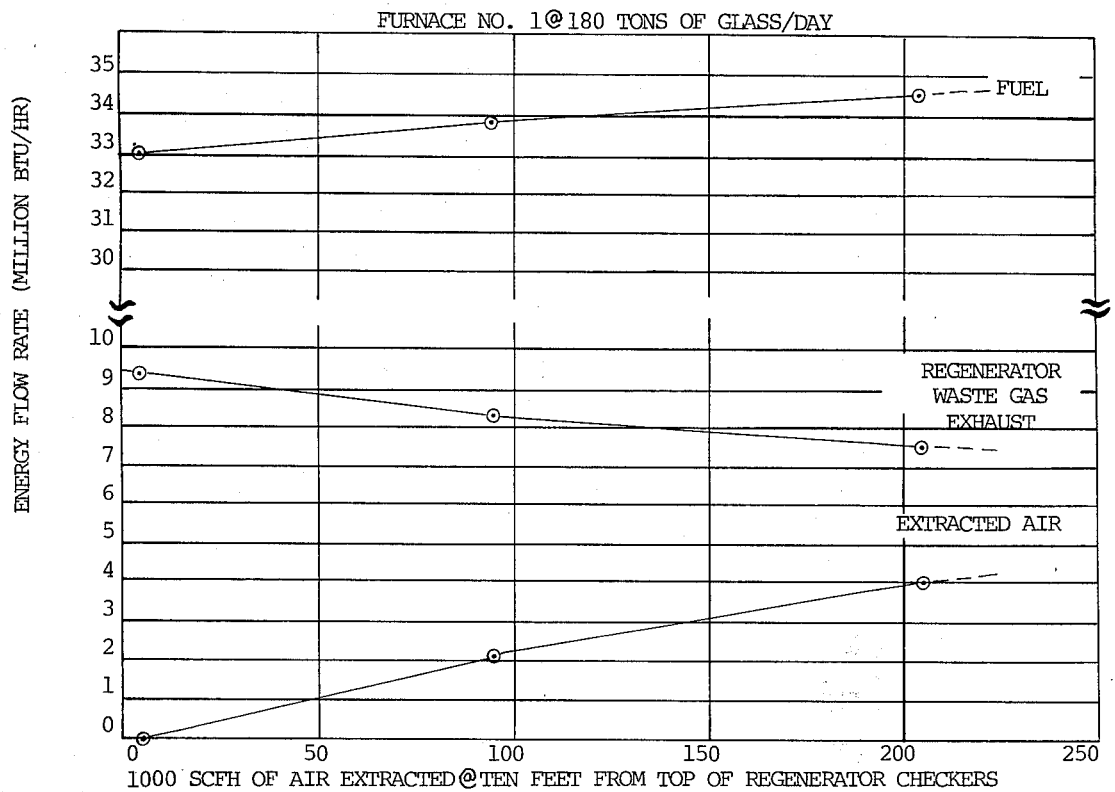
FIG. 1 is a graph showing the energy flow rate versus air extraction flow rate at an intermediate area of the air regenerator checkerwork of a glass furnace.

FIG. 1 in graph form shows plots of energy flow rates versus air extraction flow rates with the extraction location about 10 feet from the top of air regenerator checkerwork. The three curves represent the energy flows associated with the fuel consumption regenerator waste gas exhaust, and the extracted air stream.

Figure 2:
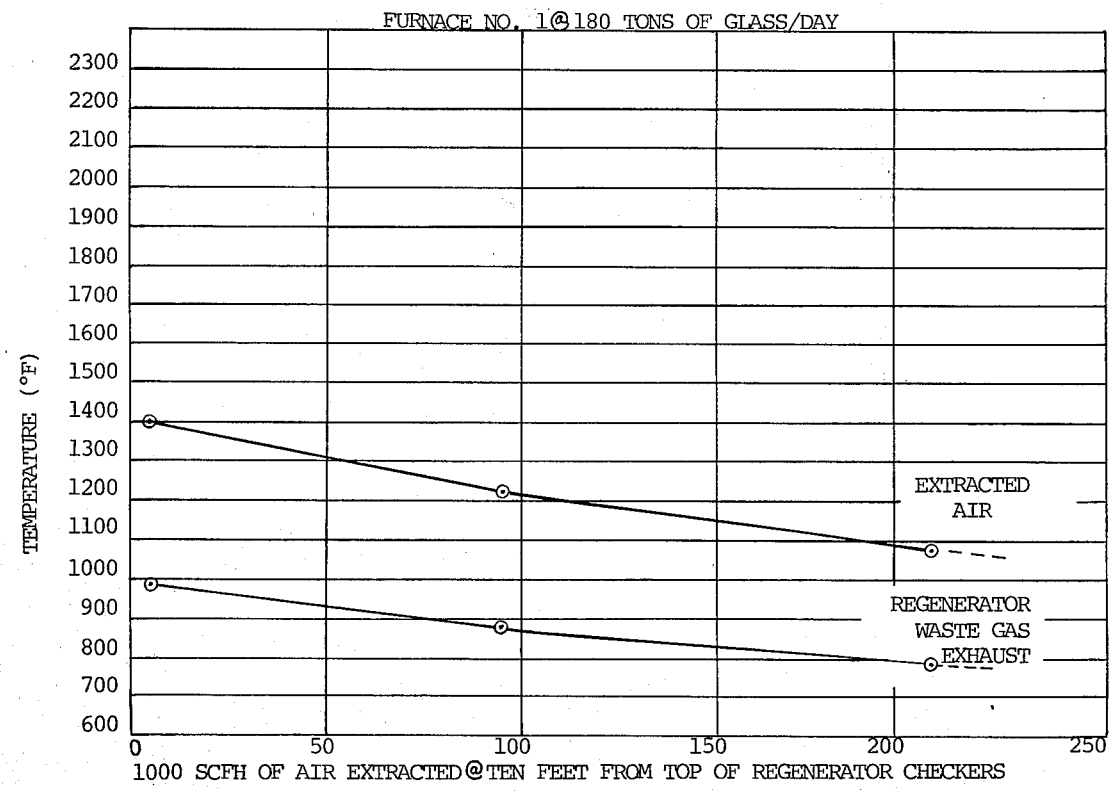
FIG. 2 is a graph showing extraction air temperature and regenerator waste gas exhaust temperature versus air extraction flow rate for the intermediate area of the furnace shown in FIG. 1.

FIG. 2 in graph form shows plots of the extraction air temperature and regenerator waste gas exhaust temperature versus extraction flow rate for the mid-level location as shown in FIG. 1.

Figure 3:
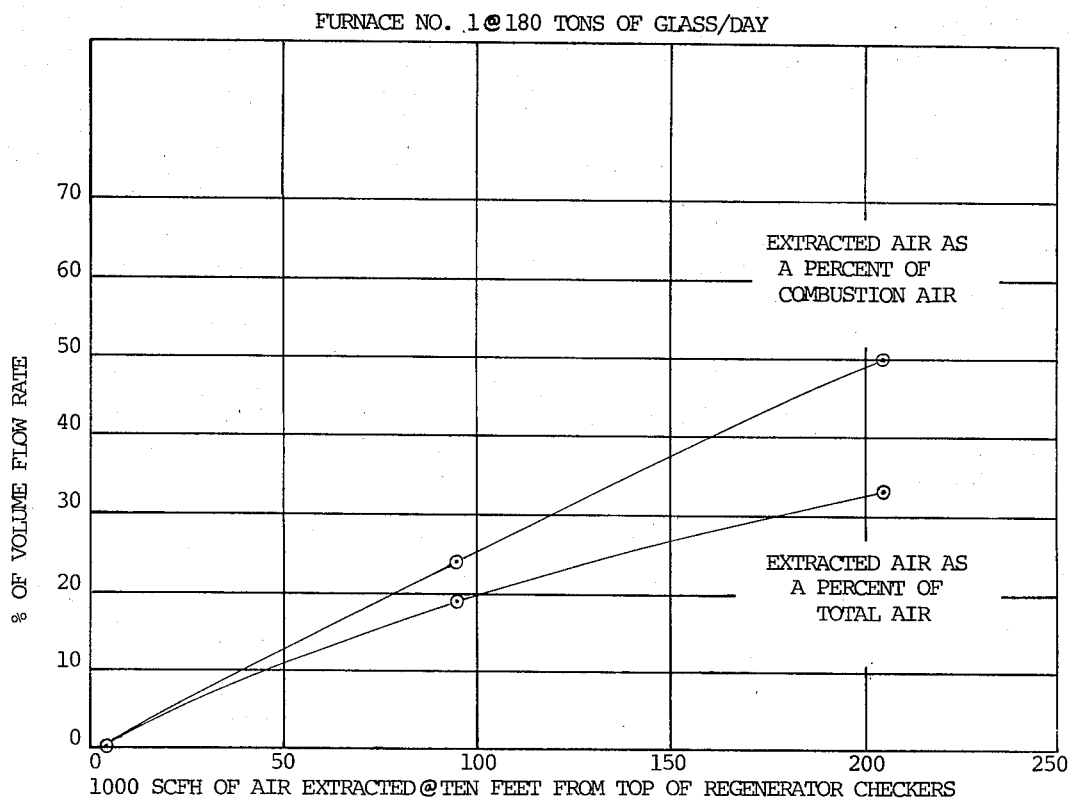
FIG. 3 is a graph showing the volumetric air flow percentages for the example set forth in FIGS. 1 and 2.

FIG. 3 in graph form shows plots of volumetric air flow percentages. In this figure, the upper curve represents the extraction flow rate as a percentage of combustion air requirements, and the lower curve as a percentage of total air regenerator flow rate.

Figure 4:
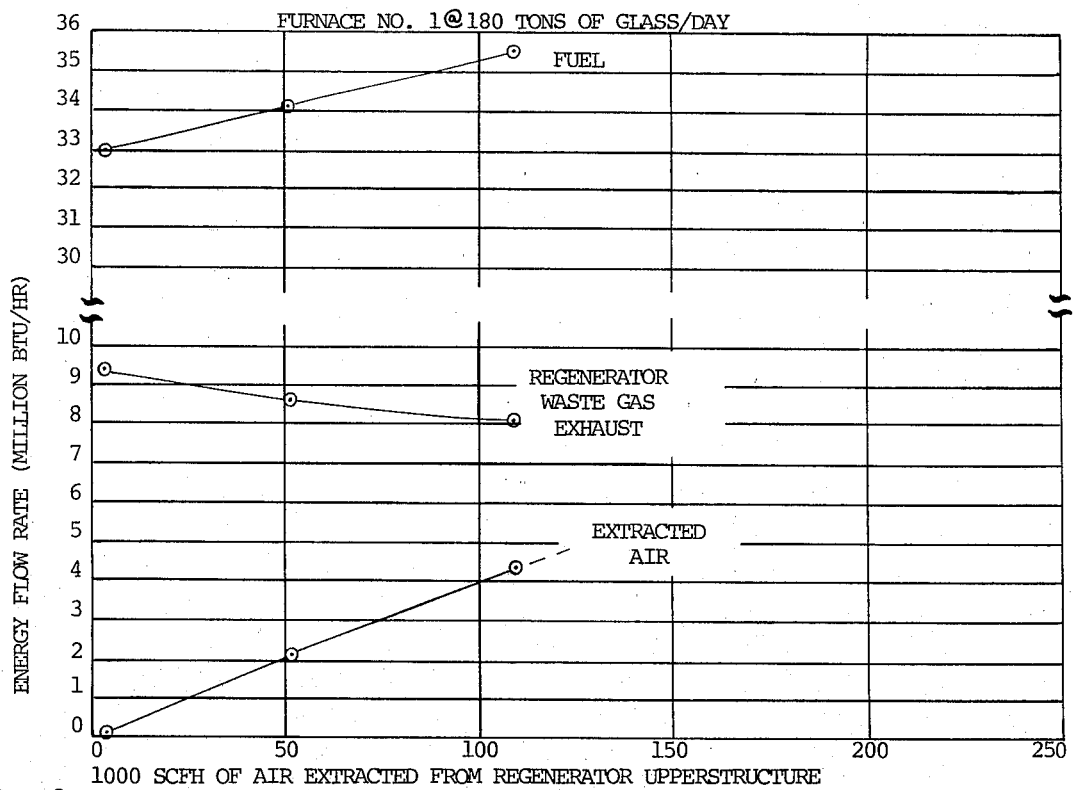
FIG. 4 is a graph similar to FIG. 1 with the air extraction at an upper region of the regenerator structure.
Figure 5:
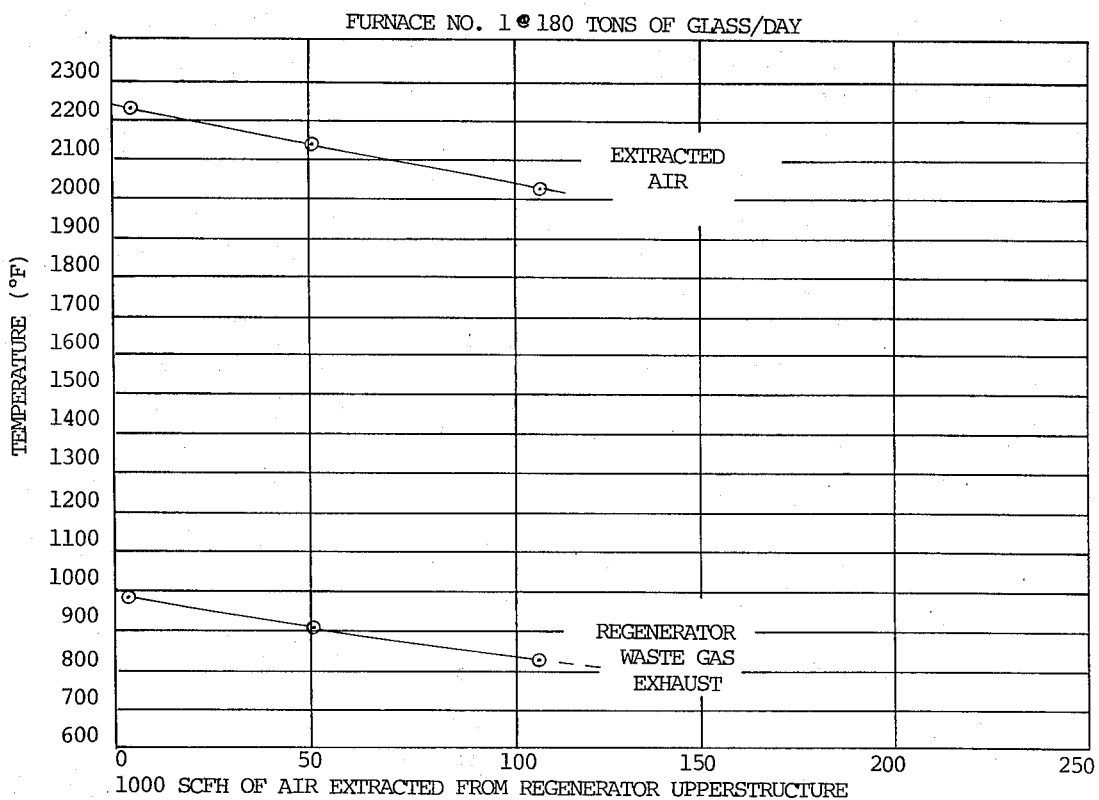
FIG. 5 is a graph similar to FIG. 2 with the air extraction at an upper region of the regenerator structure.
Figure 6:
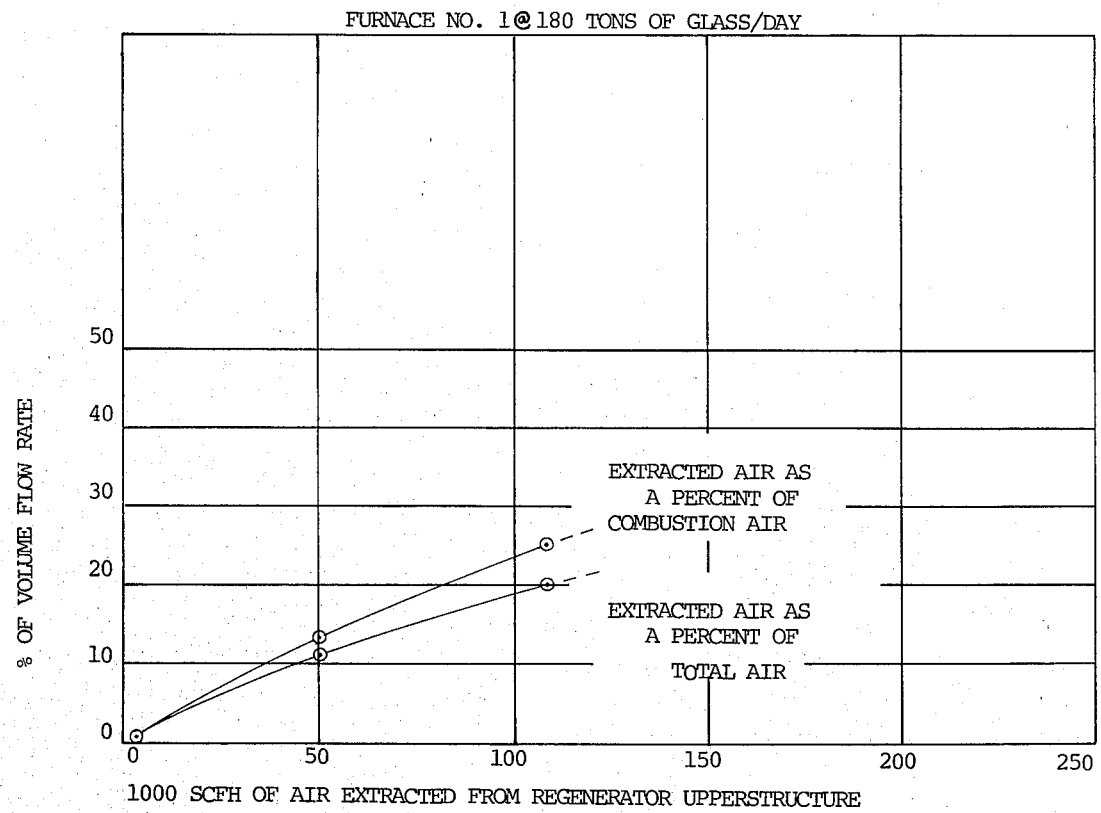
FIG. 6 is a graph similar to FIG. 3 with the air extraction at an upper region of the regenerator structure.

FIGS. 4, 5 and 6 in graph form shows the analogous information comparable to FIGS. 1, 2, and 3, respectively, for air extraction from the regenerator upper structure location.

Figure 8:
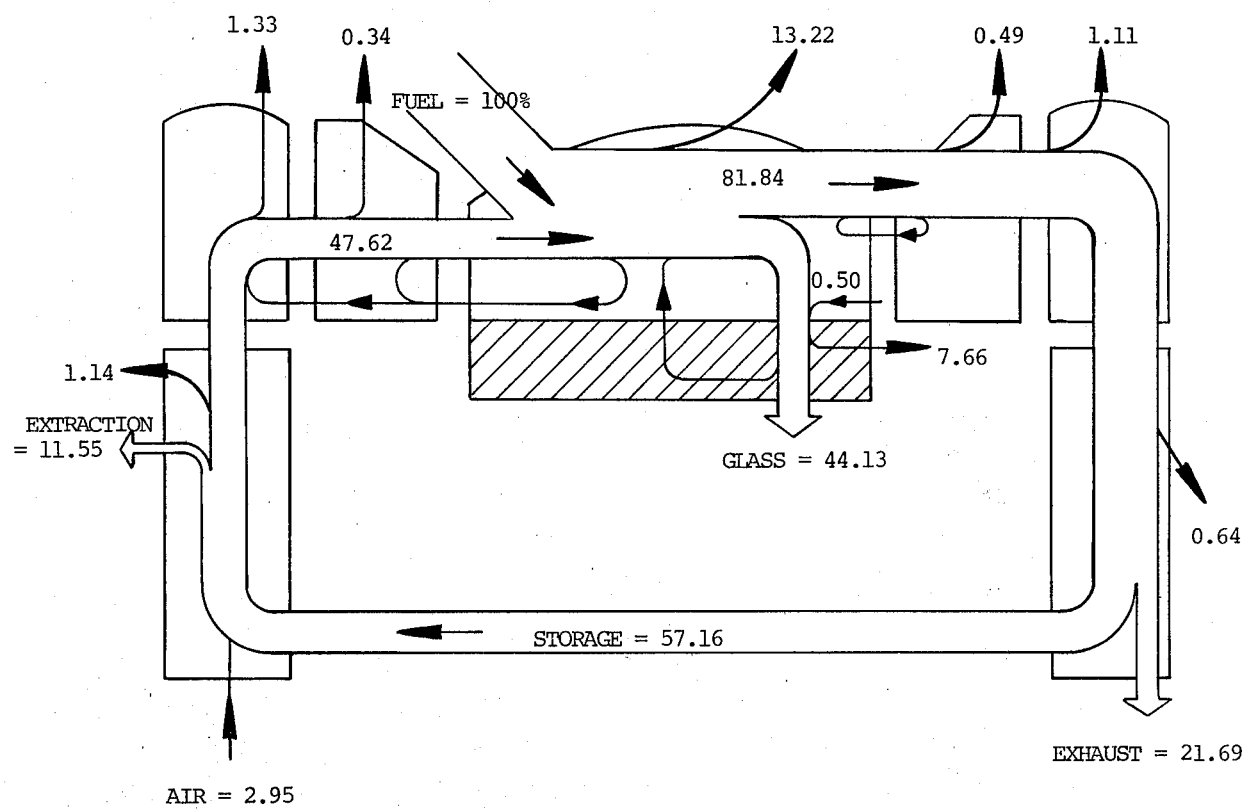
FIG. 8 is a schematic energy flow diagram similar to FIG. 7 with air extraction at an intermediate area of the regenerator structure.
Figure 9:
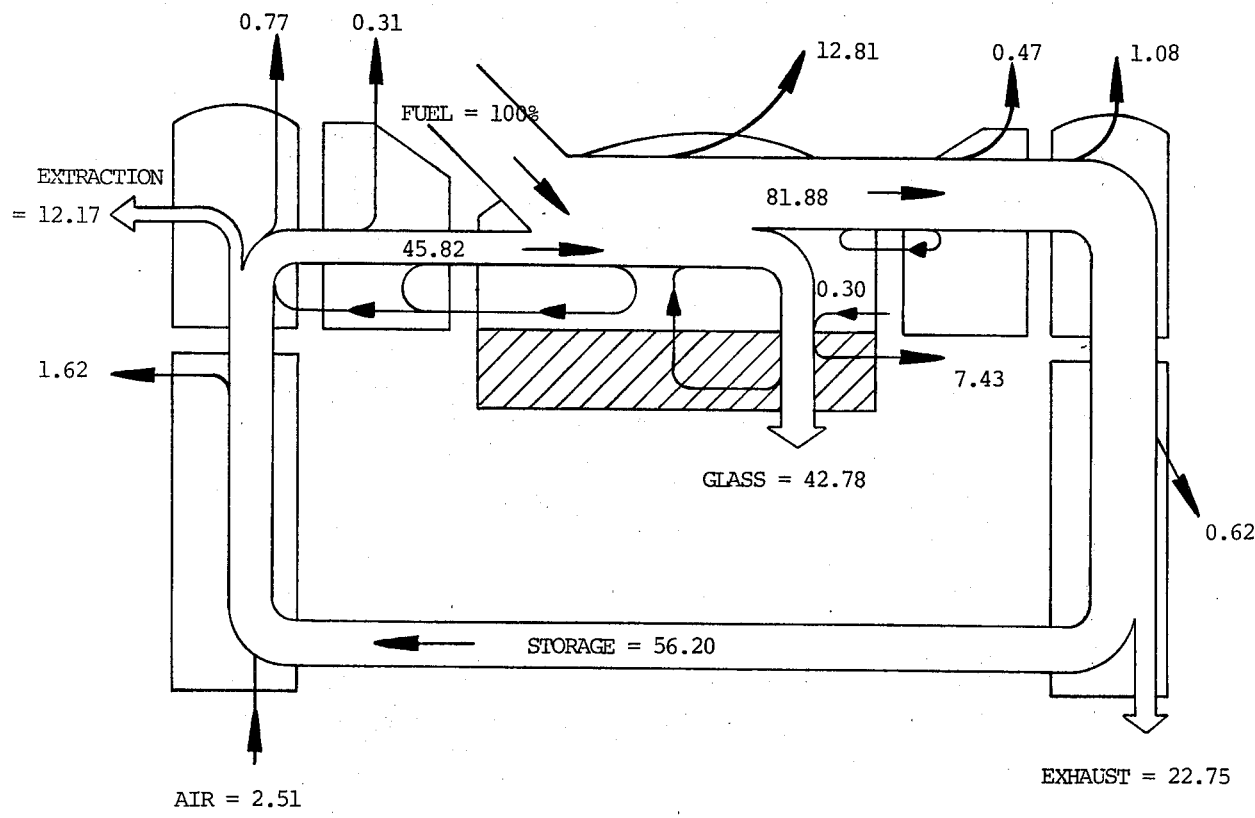
FIG. 9 is a schematic energy flow diagram similar to FIGS. 7 and 8 with air extraction at an upper region of the regenerator structure.

FIGS. 7, 8, and 9 are the energy flow diagrams for the glass furnace with (a) no air extraction (FIG. 7), (b) with air extraction from an intermediate area of the regenerator air intake side (FIG. 8), and (c) with air extraction from an upper region of the regenerator air intake side (FIG. 9).

Figure 10:
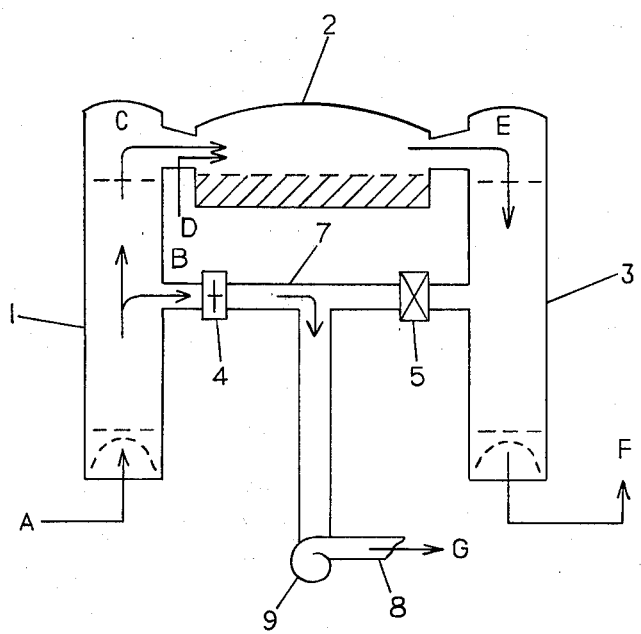
FIG. 10 is a schematic diagram of a regenerative glass furnace adapted to practicing the present invention.

FIG. 10 shows the air extraction process components and flows in a conventional regenerative glass furnace. The system components consist of the air cycle regenerator 1 which connects to the combustion chamber 2. The waste gas cycle regenerator 3 connects to the opposite side of the combustion chamber. Open valve 4 and closed valve 5 are mounted in a duct 7 which has a T-joint therein which leads to an outlet duct 8 having a fan 9. The fan conveys the hot clean air to an auxiliary energy demand. With regard to the gaseous flows, ambient air inlet A is located on the air intake side of the air cycle regenerator 1 and flows therein over the hot heat-exchange surfaces. The unitary stream is separated into extracted air B and combustion air C. Fuel D is delivered into the furnace combustion zone together with combustion air C. Combustion chamber waste gas E is exhausted through the regenerator waste gas exhaust F. The clean hot air stream B is delivered through ducts 7 and 8 to the auxiliary energy demand G. The cycle is periodically reversed on an equi-timed basis.

Within the bounds of the aforesaid examples as shown on the graphs from the data collected, the following general observations can be made.

1. The energy of the extracted air stream increases with increasing extraction flow rates, but at a decreasing rate due to the decreasing temperature of the extracted air stream.
2. The energy of the extracted air stream is derived from essentially two sources;—an increase in the fuel energy coupled with a decrease in the regenerator exhaust energy, thus constituting a positive mode of waste heat recovery.
3. The temperature of the extracted air stream can be greater than the temperature of the original waste gas stream, thus allowing far greater flexibility as a mode of waste heat recovery.
4. The extracted stream consists of clean hot air, as opposed to dirty corrosive waste gas, thus allowing far greater flexibility as a mode of waste heat recovery.
5. When air is extracted from relatively higher temperature regions of the regenerator, the extraction temperature increases, but at the expense of combustion air preheat temperature.

Thus, it may also be said for the process:
(a) Lower extraction volumes at higher temperatures yield the same extraction engery.
(b) An increased fraction of the extracted energy is derived from increased fuel consumption, and a decreased fraction is derived from decreased exhaust energy.
(c) The air extraction process should preferably be performed at a location along the regenerator flow path on the air intake side that yields an extraction temperature substantially not greater than that which is required for the external energy demand.
(d) The temperature of the extracted air stream can be controlled or modulated by simultaneously extracting two streams from both a moderate temperature region and a high temperarture region, and blending the flows to yield the desired temperature. The high temperature portion should represent the lesser flow for best extraction efficiency.

Since the air extraction process results in increased fuel connsumption, overall energy efficiency is only improved when the clean hot air stream is used in a reasonably efficient thermal process, either recycling energy back into the regenerative furnace system, e.g. for batch or cullet preheating in the case of a glass furnace, or using the extracted energy for some independent auxiliary application such as:

1. Cogeneration of electricity.
2. Steam production.
3. Space heating and/or air conditioning.
4. Chillers to reduce humidity of air that is to be compressed.
5. Process heat such as for glass annealing lehrs and the like.

The energy balances shown on FIGS. 7, 8, and 9 are not applicable if the extracted air energy is recycled back into the original furnace, such as in the case of preheating glass batch. Such cases can be simulated with the computer model, and generally show improved overall thermal efficiency, but have not been demonstrated or shown on the accompanying energy balances.

The examples shown on the drawings do not represent limiting cases, either with regard to extraction location or flow rate on the air intake side of the regenerator, as far as the energy balances are concerned. Greater fractions of the total air flow may be extracted, with potential limitations occurring due to regenerator flow characteristics, and/or economic considerations relative to the end-use of the extracted hot air.

The following Table II summarizes the energy balances for the base case simulation and each of the four extraction process examples, which are premised on a typical regenerative glass furnace for melting container glass.

TABLE II

ENERGY BALANCES (60° F. REFERENCES)
(million BTU/Ton Glass)

|  |  | Base Case | Midlevel Extraction | | Top Level Extraction | |
|---|---|---|---|---|---|---|
|  |  |  | 95000 SCFH | 205000 SCFH | 51000 SCFH | 109000 SCFH |
| INPUTS |  |  |  |  |  |  |
| Fuel |  | 4.33 | 4.43 | 4.52 | 4.47 | 4.66 |
| Air |  | 0.09 | 0.11 | 0.13 | 0.10 | 0.12 |
| Batch |  | 0.01 | 0.01 | 0.01 | 0.01 | 0.01 |
|  | Total | 4.43 | 4.55 | 4.66 | 4.58 | 4.79 |
| OUTPUTS |  |  |  |  |  |  |
| Glass |  | 1.53 | 1.53 | 1.53 | 1.53 | 1.53 |
| Chem Reactions |  | 0.46 | 0.46 | 0.46 | 0.46 | 0.46 |
| Waste Gas Exhaust |  | 1.22 | 1.09 | 0.98 | 1.13 | 1.06 |
| Refractory Heat Loss |  | 0.89 | 0.88 | 0.88 | 0.88 | 0.87 |
| Leakage |  | 0.31 | 0.31 | 0.30 | 0.30 | 0.30 |
| Air Extraction |  | 0.02* | 0.28 | 0.52 | 0.28 | 0.57 |
|  | Total | 4.43 | 4.55 | 4.67 | 4.58 | 4.79 |

*Unintentional Air Extraction, Actually leakage

FIG. 7 contains a schematic energy flow diagram in simplified form for the base case simulation. The energy flows are generally proportional to the widths of the streams shown, and have been superimposed over the basic components of a regenerative glass furnace. FIG. 8 shows a similar energy flow diagram for the mid-level air extraction case at an extraction flow rate of 205,000 SCFH. FIG. 9 shows the energy balance with extraction from an upper structure of the air regenerator at 109,000 SCFH. The aforesaid series of diagrams illustrate the amounts of energy that can be recovered from the furnace regenerator as a clean hot air stream.

It should be noted that the regenerator energy storage for the air extraction cases represents a higher fraction of the total available waste gas energy than for the base case. Thus, if the extracted hot air is treated as a useful product, the heat recovery efficiency of the regenerators increase for the extraction process. However, the combustion air preheat for the extraction cases represents a diminished fraction of waste gas energy as reflected in the associated increased fuel consumption. Obviously, the air extraction process is detrimental if the extracted hot air stream cannot be used in a reasonably efficient process or apparatus such as those enumerated above.

It may be desirable to add additional heat to the secondary portion of the preheated air such as by a burner or other heating apparatus. Also it may be desirable to control the temperature of the secondary portion of the preheated air using ambient air. Thus, the temperature and volume of the secondary air can be controlled precisely through wide limits.

Various modifications may be resorted to within the spirit and scope of the appended claims.

What is claimed is:

1. A method of operating a regenerative furnace of the type having a pair of checkerworks used alternately on the exhaust side and inlet side of said furnace, to capture a greater portion of its waste heat, comprising the steps of introducing a substantial volume of air into the checkerworks at one side of a regenerative furnace, the volume of which is greater than that required for complete combustion, passing this entire volume of air as a unitary stream through at least a first portion of the one side of the hot checkerworks of the regenerative furnace to preheat the air and substantially increase the sensible heat of the air, diverting a portion of the preheated air from the said one side of the checkerworks in advance of the combustion zone to an auxiliary heat-utilizing apparatus mounted exteriorly of said furnace, conducting the remainder portion of the preheated air to the combustion zone of the said furnace to achieve combustion of a combustible fuel, conducting all of the combustion exhaust through the exhaust side checkerworks to thereby heat the checkerworks, and adjusting the flow paths at predetermined intervals to reverse the regenerative flow system and recover heat from the other side on reversal.

2. The method in accordance with claim 1, including the step of passing said diverted portion of air through essentially all of the available heat-exchange surfaces of the hot checkerworks to achieve maximum capture of sensible heat.

3. The method in accordance with claim 1, wherein the said diverted portion of preheated air directed to said auxiliary apparatus is less than the said remainder portion of preheated air directed to said combustion zone.

4. The method in accordance with claim 1, wherein the said diverted portion of preheated air is about equal to the volume of the said remainder portion of preheated air directed to said combustion zone.

5. The method in accordance with claim 1, wherein the said diverted portion of preheated air is greater than the said remainder portion of preheated air directed to said combustion zone.

6. The method in accordance with claim 1, wherein the said diverted portion of preheated air is directed to an auxiliary heat-exchanger adapted to power generation.

7. The method in accordance with claim 1, wherein the said remainder portion of preheated air comprises the stoichiometric amount for furnace fuel combustion plus a minor amount in excess thereof to ensure complete combustion.

8. The method in accordance with claim 1, including the step of conducting both the diverted and remainder portions of preheated air through essentially all of the hot checkerwork region of a regenerative furnace prior to dividing the said portions of preheated air.

9. The improved method of operating a regenerative glass furnace so as to economically utilize a greater portion of its waste heat, comprising the steps of introducing a substantial volume of air, the volume of which is greater than that required for combustion, into the air intake side checkerworks of a regenerative glass furnace, passing the entire volume of air as a unitary stream through at least a substantial portion of the hot heat-exchange surfaces of the checkerworks of the regenerative glass furnace to substantially increase its sensible heat and thereby preheat the air, conducting a first portion of the preheated air to the combustion zone of said furnace to achieve optimum combustion of a combustible fuel therein, conducting all of the hot exhaust from the combustion zone through the exhaust side checkerworks, diverting the remaining portion of the preheated air to an auxiliary heat-exchanger apparatus mounted exteriorly adjacent to said furnace, and alternating the air intake side and exhaust side of said regenerative glass furnace on an equi-timed basis while diverting the remaining portion of the preheated air to the heat exchanger.

10. The improved method in accordance with claim 9, including the step of conducting the remaining portion of the preheated air through essentially all of the available hot heat-exchange surfaces of the regenerative glass furnace to achieve maximum capture of sensible heat.

11. The improved method in accordance with claim 9, including the step of extracting dual volumes of said remaining portion of preheated air from two different locations in the hot checkerworks on the air intake side of said regenerative glass furnace to thereby extract heat at different temperatures.

12. The improved method in accordance with claim 9, including the step of adding additional heat to said remaining portion of the preheated air prior to passing same to said auxiliary heat-exchanger apparatus.

13. The improved method in accordance with claim 9, including the step of controlling the temperature of the said remaining portion of the preheated air using ambient air.

* * * * *